April 17, 1951     A. C. WENZEL     2,549,733
COMBUSTION CONTROL APPARATUS
Filed April 8, 1948
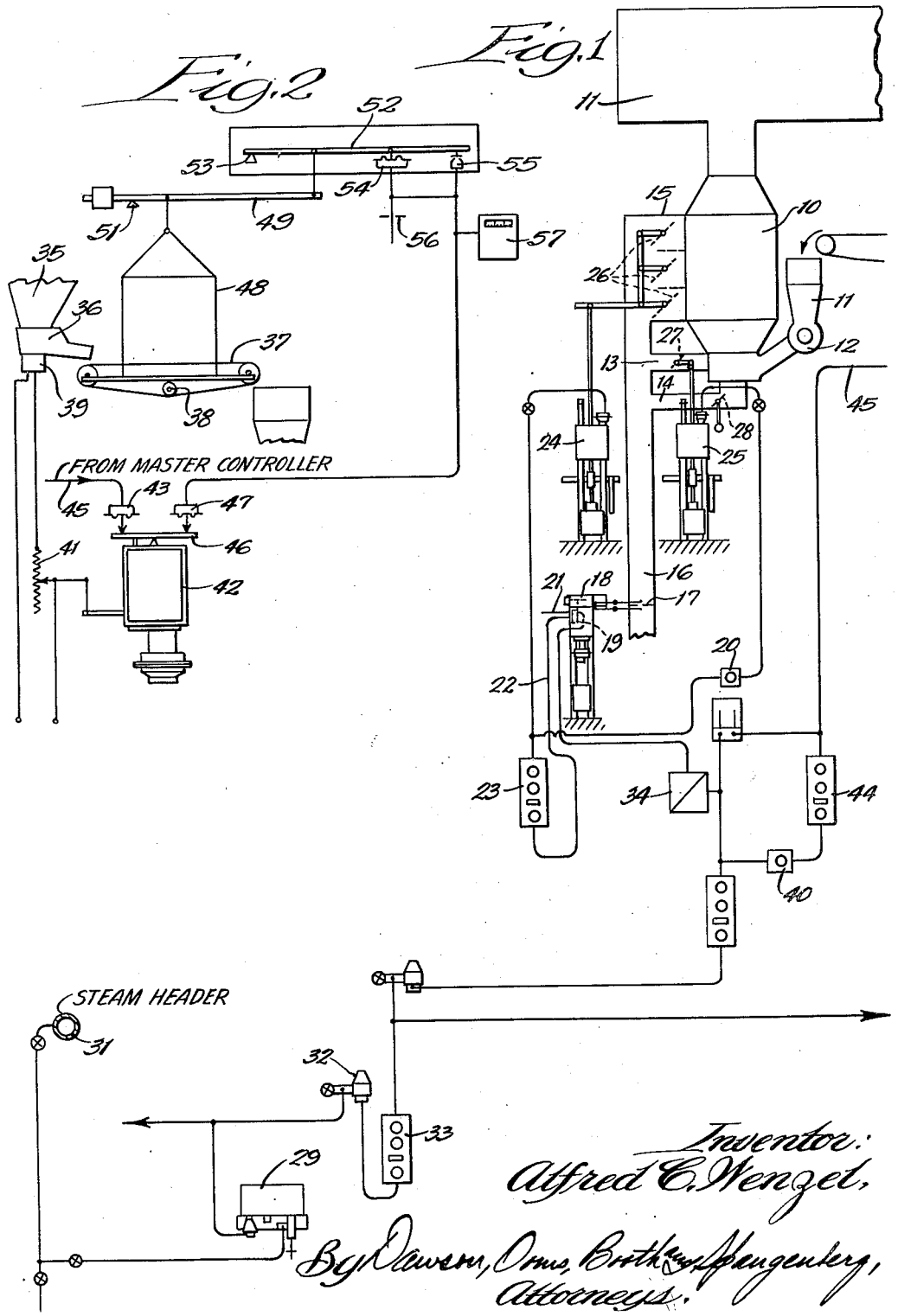
Inventor:
Alfred C. Wenzel,
By Dawson, Ooms, Booth & Spangenberg,
Attorneys.

Patented Apr. 17, 1951

2,549,733

UNITED STATES PATENT OFFICE 2,549,733

COMBUSTION CONTROL APPARATUS

Alfred C. Wenzel, Chicago, Ill., assignor to Republic Flow Meters Company, Chicago, Ill., a corporation of Illinois Application April 8, 1948, Serial No. 19,810

7 Claims. (Cl. 236—26)

This invention relates to combustion control apparatus and more particularly to apparatus for controlling the supply of fuel and air to a cyclone furnace.

In the operation of a cyclone furnace the temperature of the combustion chamber must be maintained within very close limits in order to maintain the slag layer in the furnace in molten condition and to insure proper combustion of the fuel. For this purpose it is necessary to maintain the fuel-air ratio constant under all conditions of operation and during changes in the combustion rate in order to prevent cooling of the slag layer due to an excess of either air or fuel. It is one of the objects of the present invention to provide a control apparatus which will maintain an extremely accurate ratio of fuel and air under all operating conditions.

It is another object of the invention to provide combustion control apparatus in which the fuel supplied to the furnace is weighed and the rate of fuel feed is regulated in response to the weight of fuel being supplied. In the preferred construction a fuel feeder supplies fuel to a transfer unit such as a constant speed conveyor, and the feeder is controlled in response to the weight of fuel on the conveyor.

Still another object is to provide combustion control apparatus in which the weight of fuel feed to the furnace and the air supply are simultaneously and proportionately varied in accordance with the desired rate of combustion.

The above and other objects and advantages of the invention will be more readily apparent when read in connection with the accompanying drawing, in which:

Figure 1 is a diagrammatic view of a control system for a cyclone furnace; and

Figure 2 is a partial diagram illustrating the fuel feeding mechanism.

The control is illustrated as applied to a cyclone furnace indicated generally at 10, the combustion gases from which flow into a boiler 11 to produce steam. Solid fuel such as coal is supplied to the furnace 10 from a small feed hopper 11 having a rotary seal 12 connecting it to a tangential fuel inlet in the outer end of the furnace. Primary air is supplied tangentially to the outer end of the furnace through a pipe 13, and the air together with the tangential fuel feed causes the fuel to enter the furnace in a helical spinning direction to contact the molten slag layer at the outer portion of the furnace wall and to be held by the slag layer while it burns according to the usual manner of cyclone furnace operation. Secondary air is supplied tangentially to the furnace itself through a conduit 15 which is divided into a plurality of parallel passages, and tertiary air is supplied axially to the outer end of the furnace through a conduit 14, as shown.

The air for combustion is supplied to the furnace under forced draft through a main air supply conduit 16. The conduit 16 is formed with an orifice 17, the opposite sides of which are connected to a loading diaphragm in a regulator 18 which may be of the type more particularly described and claimed in the Smoot Reissue Patent No. 16,507 or in the patent to O'Connor, No. 2,039,924. This regulator controls a relay valve 19 supplied with air under pressure through a pipe 21 to send out a regulated loading pressure through a pipe 22 which is proportional to the operation of the regulator 18. The loading pressure in the pipe 22 goes through a transfer unit 23 to a pair of air control regulators 24 and 25 which may be of the type disclosed in the patent to Rosenberger No. 2,220,176. A ratio controller 20 may be inserted in the connection to the regulator 25 to control the ratio of primary and secondary air. The transfer unit 23 may contain switch over valves to supply either the loading pressure from the regulator 18 or a manually adjustable loading pressure to the regulators 24 and 25, as desired.

The regulator 24 controls valves 26 in the secondary air passage and will position such valves in accordance with the loading pressure supplied to the regulator to control the amount of secondary air. The regulator 25 similarly controls a valve 27 in the primary air passage 13 to control the amount of primary air. A valve 28 in the tertiary air passage 14 is manually settable and is ordinarily not adjusted during operation of the furnace.

The air supply to the furnace is preferably regulated by a master controller in accordance with the desired combustion rate. As shown, a master controller 29 which may be of the type described in Smoot Reissue Patent No. 16,507 is connected to a steam header 31 forming an outlet header for the boiler 11 to produce a master loading pressure varying in accordance with steam pressure. The master loading pressure is transmitted through a relay valve 32 and a transfer unit 33 to a pressure squaring device 34 which is in turn connected to a master loading diaphragm on the regulator 18. The squaring device serves to square the master loading pressure so that it will balance properly against the differential pressure across the diaphragm 17 to produce a loading pressure in the pipe 22 which is proportional to both the master loading pressure and the flow through the main air inlet 16. The total flow through the main air inlet 16 is controlled by the valves 26, 27 and 28 so that the regulators 24 and 25 will be adjusted by the loading pressure from the regulator 18 to position the valves so that the desired total flow of air to the furnace is produced. Thus the air flow is at all times proportional to the master loading pressure and is divided into primary, secondary and tertiary air in accordance with the respective settings of the valves 27, 26 and 28.

Fuel is supplied to the hopper 11 to be fed through the rotary seal 12 into the furnace by a fuel feeding apparatus more particularly disclosed in Figure 2. As shown, the fuel in the form of relatively fine coal is supplied from a main hopper 35 to a variable rate fuel feeding unit 36 which may be a vibrator type unit to a transfer unit 37 shown as a conveyor driven at a constant speed by a motor 38. The feeder unit 36 is operated by a motor 39 supplied with electricity through an adjustable rheostat 41 by the adjustment of which the rate of fuel feed is varied. The rheostat 41 is connected to a regulator 42 to be controlled thereby.

According to the present invention the regulator 42 is responsive to master loading pressure and to the weight of fuel on the conveyor so that the rate of fuel fed to the furnace will be accurately controlled. As shown, the master loading diaphragm 43 on the regulator is connected to the master controller 29 through a ratio control valve 40, a transfer unit 44 and a pipe 45. The diaphragm 43 tends to urge a weigh beam 46 on the regulator 42 in one direction and the beam is balanced by a diaphragm 47 supplied with a loading pressure proportional to the weight of the fuel on the conveyor.

For this purpose the conveyor is suspended for vertical movement and is diagrammatically illustrated as being supported by a frame 48 which is suspended from a balance beam 49 supported on a fixed pivot 51. The end of the beam 49 is connected to a second beam 52 pivoted at 53 and which is balanced by a diaphragm 54. The end of the beam approaches a bleed nozzle 55 supplied with air through a restriction 56 so that by the approach and recession of the beam relative to the nozzle the pressure acting on the diaphragm 54 will be regulated. This pressure may be transmitted to an integrator 57 to indicate the total amount of fuel supplied to the furnace and to the diaphragm 47 to act thereon.

In operation as long as the master loading pressure remains constant the rate of air supply to the furnace will be held constant by the regulators 18, 24 and 25. The fuel supply will also be held constant by the regulator 42 which responds to the weight of fuel on the conveyor to maintain the weight of fuel constant. By proper adjustment of the apparatus, the correct fuel-air ratio will, therefore, be maintained.

Upon a change of master loading pressure due to a change in steam pressure or in manual control through the transfer unit 33, the fuel and air supplies will be changed simultaneously and proportionately to maintain the desired ratio. A change in master loading on the regulator 18 will produce a change in the loading pressure in the pipe 22 and will reset the valves 26 and 27 through the regulators 24 and 25 to change the total air supply to the furnace. Since the regulator 18 is responsive to the drop across the orifice 17, the total air supply will always be proportional to the master loading pressure.

At the same time, a change in pressure on the diaphragm 43 will cause the regulator 42 to adjust the rheostat 41 thereby to change the rate of fuel feed. Since the fuel feed is proportional to the weight of the fuel on the conveyor 37 and to the master loading pressure, the fuel feed will also be proportional at all times to the master loading pressure. Preferably the conveyor 37 is relatively short so that there will be a minimum delay between a change in master loading pressure and an actual change in fuel supplied to the furnace through the rotating seal 12. Since the fuel is accurately weighed at all times, a very accurate control of the quantity of fuel is obtained.

While one embodiment of the invention has been shown and described in detail herein, it will be understood that this is illustrative only and is not to be taken as a definition of the scope of the invention, reference being had for this purpose to the appended claims.

What is claimed is:

1. Combustion control apparatus comprising a fuel feeding device, a regulator for the fuel feeding device to control the rate of fuel feed, a transfer unit receiving fuel from the feeding device to transfer it to a combustion zone, means connecting the regulator to the transfer unit to control the regulator in response to the weight of fuel on the transfer unit, an air supply conduit, control means to control the air flow through the supply conduit, a regulator for the control means, a controller responsive to a condition affected by the combustion to produce a loading force, and means connecting the controller to the regulators to control the regulators in response to the loading force.

2. Combustion control apparatus comprising a fuel feeding device, a regulator for the fuel feeding device to control the rate of fuel feed, a transfer unit receiving fuel from the feeding device to transfer it to a combustion zone, means connecting the regulator to the transfer unit to control the regulator in response to the weight of fuel on the transfer unit, an air supply conduit, control means to control the air flow through the supply conduit, a regulator for the control means, and means to supply a loading force to the regulators simultaneously to control the regulators to maintain a desired combustion rate.

3. In combustion control apparatus, solid fuel feeding means comprising a fuel feeding unit, a conveyor unit to receive solid fuel from the feeding unit and to support and transfer the fuel, a regulator, control means for the fuel feeding unit connected to the regulator to be controlled thereby, and means responsive to the weight of fuel supported on the conveyor unit to control the regulator.

4. In combustion control apparatus, solid fuel feeding means comprising a fuel feeding unit, a conveyor unit to receive solid fuel from the feeding unit and to support and transfer the fuel, a regulator, control means for the fuel feeding unit connected to the regulator to be controlled thereby, means responsive to the weight of fuel supported on the conveyor unit to control the regulator to maintain a constant weight of fuel on the conveyor unit, and means responsive to a condition affected by combustion of the fuel to adjust the regulator thereby to control the weight of fuel maintained on the conveyor unit.

5. In combustion control apparatus, fuel feeding means comprising a fuel feeding unit, a conveyor receiving fuel from the fuel feeding unit, a regulator, control means for the fuel feeding unit connected to the regulator to be controlled thereby, balance means supporting the conveyor, and a control element on the regulator connected to the balance means to control the regulator in response to the weight of fuel on the conveyor.

6. In combustion control apparatus, fuel feeding means comprising a fuel feeding unit, a conveyor receiving fuel from the fuel feeding unit, a regulator, control means for the fuel feeding unit connected to the regulator to be controlled thereby, balance means supporting the conveyor, means operated by the balance means to produce a loading pressure responsive to the weight of fuel on the conveyor, and a control element in the regulator responsive to the loading pressure to control the regulator.

7. In combustion control apparatus, fuel feeding means comprising a fuel feeding unit, a conveyor receiving fuel from the fuel feeding unit, a regulator, control means for the fuel feeding unit connected to the regulator to be controlled thereby, balance means supporting the conveyor, means operated by the balance means to produce a loading pressure responsive to the weight of fuel on the conveyor, a control element in the regulator responsive to the loading pressure to control the regulator, and a second control element in the regulator responsive to a condition affected by combustion of the fuel.

ALFRED C. WENZEL.

REFERENCES CITED

The following references are of record in the file of this patent:

UNITED STATES PATENTS

| Number | Name | Date |
| --- | --- | --- |
| 1,522,877 | Gibson | Jan. 15, 1925 |
| 1,537,044 | Gibson | May 5, 1925 |
| 1,837,923 | Quinn | Dec. 22, 1931 |
| 1,863,677 | Vodoz | June 21, 1932 |
| 1,875,032 | Landgraf | Aug. 30, 1932 |
| 1,949,866 | Huet | Mar. 6, 1934 |
| 2,069,857 | Shagaloff | Feb. 9, 1937 |
| 2,143,820 | Payn | Jan. 10, 1939 |
| 2,150,113 | Wunsch et al. | Mar. 7, 1939 |
| 2,414,467 | Hunt | Jan. 21, 1947 |
| 2,433,725 | Ziebolz | Dec. 30, 1947 |